INVENTOR.
MICHAEL COOPERMAN
BY John V. Regan
Attorney

INVENTOR.
MICHAEL COOPERMAN
BY John V. Regan
Attorney

United States Patent Office 3,504,199 Patented Mar. 31, 1970

3,504,199

SQUARE WAVE GENERATOR COMPRISING BACK-TO-BACK SERIES-CONNECTED CHARGE STORAGE DIODES

Michael Cooperman, Cherry Hill, N.J., assignor to RCA Corporation, a corporation of Delaware Filed Aug. 16, 1966, Ser. No. 572,858
Int. Cl. H03k *5/00, 5/12*
U.S. Cl. 307—261 9 Claims

ABSTRACT OF THE DISCLOSURE

Each period of an alternating signal such as a sine wave is translated to a pair of pulses of opposite polarity, each pulse with a steep lagging edge. The means for translating may include, for example, a pair of back-to-back connected, charge storage diodes. The sine wave may be delayed relatively to the pulses an interval sufficient to make the regions of the sine wave of maximum slope time coincident with the steep lagging edges of the pulses and then summed with the pulses. Alternatively, the pulses may be translated to an alternating signal having faster rise and fall times than the sine wave and this alternating signal summed with the delayed pulses. In both cases, the resultant wave has relatively steep leading and lagging edges and readily may be translated to a square wave.

Figure 1:
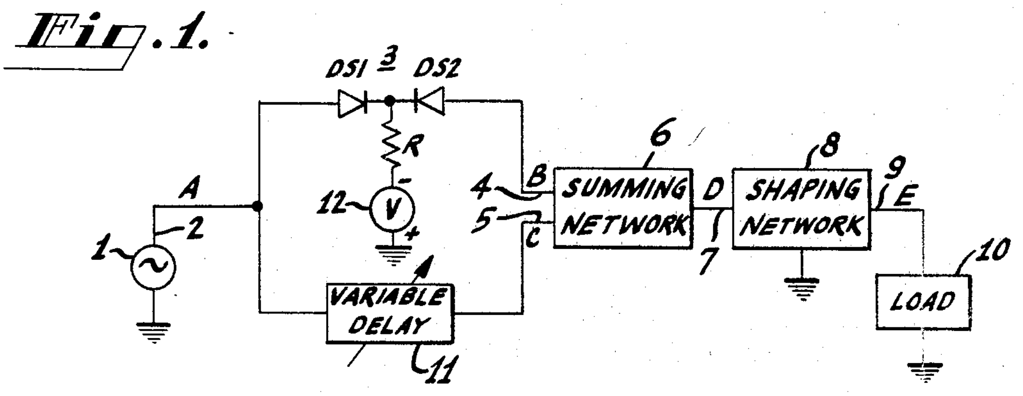

Square wave type signals having sharp transitions, i.e., fast rise and fall times, are important for timing or clocking the operations performed by many systems such as data processing, video, radar and the like. In high speed data processing systems, if the transitions are relatively slow corresponding to slow rise and fall times (say 5 to 50 nanoseconds or more) the timing accuracy of the various operations performed is seriously degraded. On the other hand, if the transitions are relatively fast corresponding to fast rise and fall times (on the order of a fraction of a nanosecond) the timing accuracy is decisively improved. Of course, fast transitions also facilitate rapid repetition rates and higher operating speeds for the processing equipment.

One scheme for providing a square wave with sharp transitions is to clip the peaks of a sinewave. In order to obtain sharp transitions, the sinewave amplitude must be large compared to the desired output amplitude, thereby resulting in undesirable power consumption.

Other schemes for providing a square wave with sharp transitions utilize tunnel diode arrangements to shape periodic signals. Although these schemes are adequate in some cases to provide sharp transitions, the tunnel diode voltage output (typically about 0 to 0.5 volt) limits the amplitude of the square wave, and hence, limits the utility of such arrangements to systems employing relatively small voltage swings.

Further schemes utilize charge storage diode arrangements to shape periodic signals. Charge storage diodes are semiconductor devices which exhibit a high conductance to positive signals applied in the forward direction (i.e., from anode to cathode) as well as a high conductance, for a period of time called the storage period, the positive signals applied in the reverse direction (i.e., from cathode to anode). At the end of the storage period, the reverse conductance of a storage diode decays abruptly or "snaps-off" to the usual low reverse conductance of a semiconductor diode. Thus, the voltage developed across the storage diode exhibits an abrupt change during the decay period. In addition to the foregoing characteristics, the voltage output of the storage diode is not limited to small values so that storage diodes are well suited for achieving fast transitions.

An object of this invention is to provide a generator for generating output signals having extremely sharp transitions.

Another object of this invention is to provide a square wave generator capable of extremely high repetition rates.

Yet another object is to provide a signal generator for generating sharp transition signals, the amplitude of which can be relatively large without degradation of the transition times.

In accordance with the illustrated examples of the invention, a circuit arrangement responds to a source of periodic signals of fundamental frequency *f* to generate a first waveform of bipolar pulses characterized by both the fundamental frequency *f* and the higher order harmonics thereof so that one transition of each pulse is relatively fast or steep. The circuit arrangement includes devices, such as storage devices, for converting slow transitions to fast transitions. This first waveform is summed with a second periodic waveform of the same fundamental frequency *f*. The first and second waveforms are so positioned in time that the fast transitions of the first wave form overlap the transitions of the second waveform so that when the two waveforms are summed, the resultant output waveform is substantially a square wave which has relatively fast transitions as compared to the wave form transitions of the input source.

Figure 2:
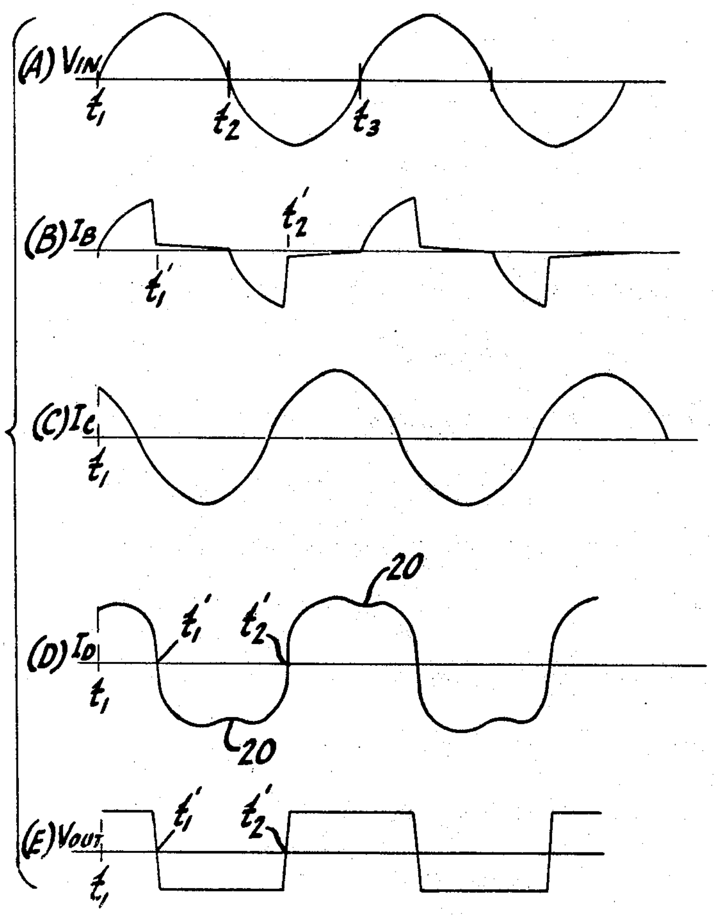
Figure 3:
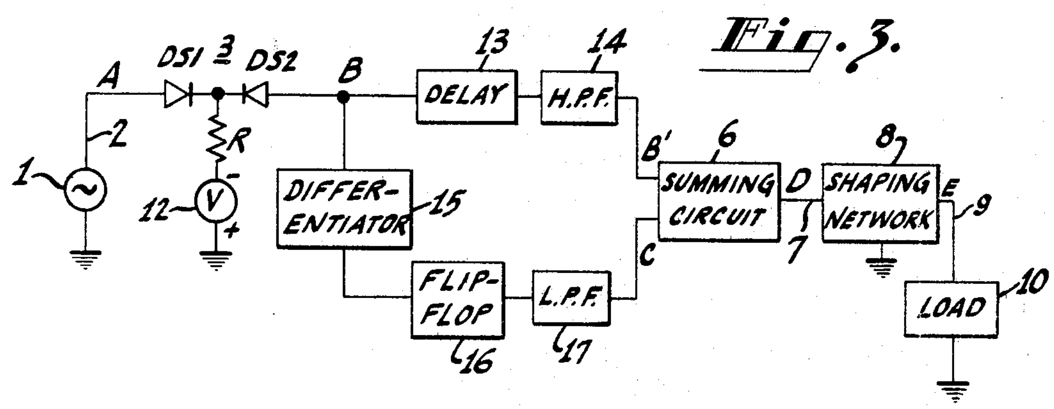
Figure 4:
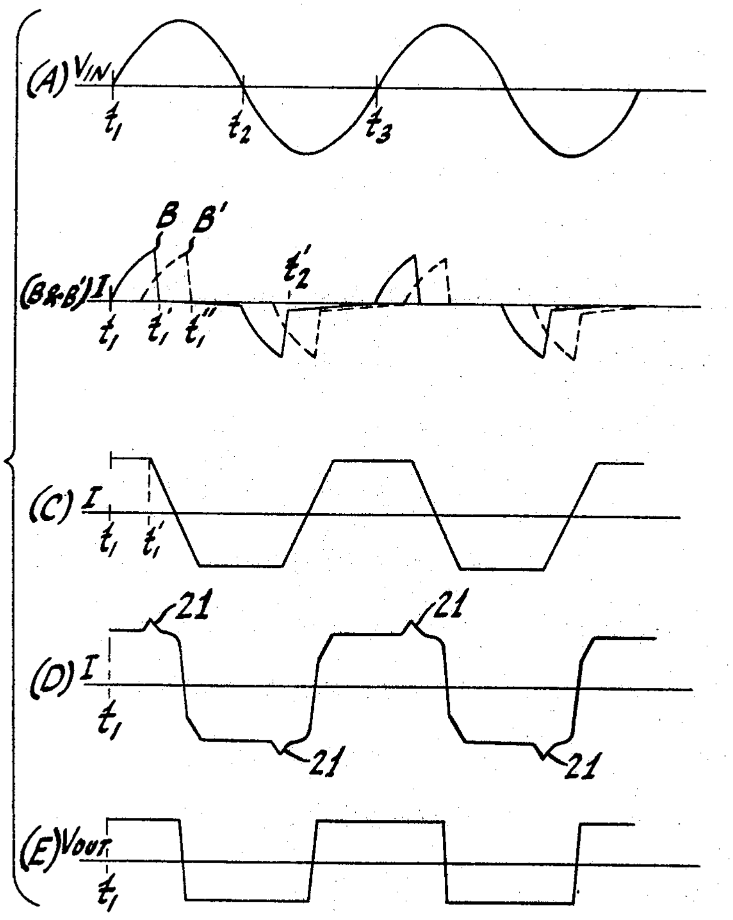

In the accompanying drawings, like reference characters denote like elements, and:

FIGS. 1 and 3 are schematic circuit diagrams of signal generator embodiments of the present invention; and FIGS. 2 and 4 are voltage and current waveforms which occur at various points in the signal generators of FIGS. 1 and 3, respectively.

Referring now to FIG. 1, the input signal source 1 is illustrated as a sinewave generator of fundamental frequency *f*. However, it should be noted that the generator 1 need not be a sinewave generator but may be some other periodic signal generator. In fact, the signal generator 1 may have a rather poor periodic wave shape which is characterized by fundamental frequency *f* and by poor harmonic content, that is, the signal contains very little, if any, of the higher order harmonics of the frequency *f* so that the transitions from peak to peak are relatively slow. For sake of convenience, the generator 1 is illustrated as a sinewave generator capable of generating a sinewave at its output terminal 2, which is illustrated as voltage waveform A in FIG. 2.

The other terminal of the generator 1 is connected to a point of reference potential such as circuit ground, as illustrated by the conventional symbol therefor in FIG. 1. The periodic output signal waveform A of the generator 1 is applied from the generator terminal 2 to a circuit arrangement 3 which is operative to generate at the point B, a bipolar current waveform of the type illustrated in FIG. 2B. The circuit arrangement 3 includes devices which are capable of converting the slow transitions of the input waveform A to fast transitions. Depending partly upon how fast or sharp the transition need be, the devices, for example, might be transistors, tunnel diodes, storage diodes and the like connected in suitable arrangements. However, the preferred embodiments of the invention utilize charge storage diodes for the circuit arrangement 3. Thus, a pair of storage diodes DS1 and DS2 have their cathodes connected in common by way of a resistor R to the negative terminal of a source of operating voltage 12, the positive terminal of which is connected to circuit ground. The bias source 12 may be any suitable source of operating energy such as a battery. The anode of the storage diode DS1 is connected directly to the generator terminal 2; while the anode of the storage diode DS2 is connected to an input terminal 4 of a summing circuit 6.

The summing circuit 6 has another input terminal 5 to which is applied the current waveform C which is illustrated in FIG. 2C. The current waveform C is derived from the input voltage waveform A by means of the delay circuit 11 which is connected between the generator terminal 2 and the summing circuit terminal 5. The summing circuit 6, which may be any suitable signal adding circuit such as a resistive network, sums the waveforms B and C to provide at its output terminal 7 the waveform D of FIG. 2. The waveform D is applied by way of a shaping network 8 to an output terminal 9 to which is connected the utilization or load impedance 10. The other terminals of the shaping network 8 and the load impedance 10 are illustrated as being connected to circuit ground. The waveform E is a voltage waveform which appears across the load device 10.

Before turning to the operation of the signal generator of FIG. 1, the characteristics of the charge storage diodes DS1 and DS2 will be discussed. Briefly, a storage diode is a semiconductor PN junction device which possesses the same high conductance properties as ordinary semiconductor diodes when biased in the forward direction, that is, when the anode of a storage diode is positive with respect to the cathode thereof. When either an ordinary diode or storage diode is biased in the forward direction, minority carriers accumulate in the P and N regions of the diode, that is, holes flow into the N region and electrons flow into the P region of the diode. Upon application of a reverse bias current to either the storage diode or an ordinary diode, the diode initially presents a very low impedance or high conductance as the transient reverse current occurs due to the return flow of the previously accumulated minority carriers. The time interval during which this reverse current flows is sometimes called the storage period. Upon removal of the accumulated carriers, the storage diode or the ordinary semiconductor diode assumes its normal high reverse impedance or low conductance condition in a time interval which is called the decay period. The features which distinguish the storage diode from the ordinary semiconductor diode are that the storage time of a charge storage diode is relatively long compared to the storage time of the ordinary semiconductor diode and that the decay period is very short on the order of a fraction of a nanosecond compared to a much longer decay period for the ordinary semiconductor diode. Thus, the storage diode upon being reverse biased subsequent to being forward biased continues to exhibit a high conductance during the storage period and at the end of the storage period abruptly changes or snaps from the high to the low conductance condition period. The time duration of the storage period is dependent upon, inter alia, the magnitude and duration of current flow through the storage diode in the forward direction before being reverse biased.

Turning now to the operation of the circuit arrangement 3, the diode DS1 is biased for forward current conduction during positive half cycles of the input voltage waveform A; while the diode DS2 is biased for forward current conduction during negative half cycles. The amount of current conducted by each storage diode is determined in part by the values of the resistors R and the bias source 12 which together function to provide a current path between the common cathode connection and circuit ground. Referring particularly to the period from time $t_1$ to time $t_3$, the waveform A is shown as being positive from time $t_1$ to time $t_2$ and as being negative from time $t_2$ to time $t_3$. During the negative half cycle which occurred previous to time $t_1$, the storage diode DS2 was forward biased so that minority carriers accumulated within the P and N regions of the diode. Thus, when the input voltage waveform A begins going positive at time $t_1$ both diodes DS1 and DS2 are in a high conductance condition with diode DS1 conducting current in the forward direction and diode DS2 conducting current in the reverse direction. Diode DS2 continues to conduct during its storage period until the previously accumulated minority carriers are depleted at which time ($t_1'$) the conductance thereof abruptly changes from the high to the low condition. The current waveform B in FIG. 2 illustrates this operation as the current $I_b$ through the diodes DS1 and DS2 begins increasing at time $t_1$ in the same manner as the input voltage waveform A, and decreases abruptly at time $t_1'$. Thus, the interval from $t_1$ to $t_1'$ includes both the storage and the decay periods of the storage diode DS2.

As the input voltage waveform A continues to be positive from time $t_1'$ to time $t_2$, the diode DS2 remains in its low conductance condition so that substantially no current flows therethrough. Also during this period from time $t_1'$ to $t_2$ the storage diode DS1 continues to conduct in the forward direction thereby accumulating minority carriers. As the input voltage waveform A begins to go negative at time $t_2$, the storage diode DS2 becomes forward biased and the storage diode DS1 becomes reverse biased but remains in a high conductance condition. The storage diode DS2 continues to conduct current in its reverse direction until the previously stored minority carriers are depleted at which time ($t_2'$) the conductance of the diode changes abruptly from the high to the low condition. During the time interval from $t_2'$ to $t_3$, the input voltage waveform A continues to be negative so that the storage diode DS1 remains in a low conductance condition and substantially no current flows therethrough. Also during this interval from $t_2'$ to $t_3$, the storage diode DS2 continues to conduct in the forward direction to thereby accumulate minority carriers which will then be depleted during the next succeeding positive half cycle.

It is seen then that the circuit arrangement 3 responds to the voltage waveform A to provide a bipolar current pulse waveform B characterized by the fundamental frequency $f$ of waveform A and by the higher order harmonics thereof so that the trailing edge transition of each pulse is relatively fast or steep. The positive pulses have falling or negative going trailing edge transitions; while the negative pulses have rising or positive going trailing edge transitions. In accordance with the present invention, the waveform B is added to a further periodic waveform C of fundamental frequency $f$ to obtain resultant waveform D which is substantially square in shape.

In the embodiment of FIG. 1, the current waveform C is derived from the input voltage waveform A by means of a delay circuit 11. The delay circuit 11 may be any suitable delay line which functions to delay the waveform A sufficiently to position the current waveform C so that the positive and negative going fast transitions of waveform B overlap positive and negative going transitions, respectively, of waveform C. The actual amount of delay needed is dependent upon the storage times of the snap diodes DS1 and DS2 and therefore differ for different values of the bias source 12 and the resistor R as well as for different types of storage diodes. In addition, the amount of delay needed varies with the frequency of the input signal. Therefore, the delay means 11 may be variable as illustrated in FIG. 1.

The summing circuit 6 sums the current waveforms B and C to provide a substantially square waveform D which has fast transition times and fairly constant amplitude levels. As can be seen in FIG. 2, the amplitude levels of the waveform D are not truely constant but contain slight dips 20. In some applications, these amplitude dips 20 are of little or no consequence, so that waveform D can be directly applied to the load impedance 10. However, in other applications the amplitude dips 20 might have serious effects upon the load impedance 10. For applications of this type, the shaping network 8 is utilized to clip the waveform D to provide the waveform E which has substantially constant amplitude levels. The shaping network 8 may be any suitable network which includes, for example, a diode clipping arrangement. In addition, the shaping network 8 may include DC level shifting circuitry for shifting the DC level through waveform E. For example, the DC level illustrated in the FIG. 2 waveform could be shifted to the lower or minimum amplitude levels of the square wave so that the square wave E appears as a sequence of positive going square pulses.

A further embodiment of the signal generator of the present invention is illustrated in FIGS. 3 and 4. Similarly to FIGS. 1 and 2, the waveforms illustrated in FIG. 4 occur at the correspondingly labeled points in the circuit schematic of FIG. 3. In FIG. 3, signal source 2 and the circuit arrangement 3 are connected in exactly the same manner as in FIG. 1. The FIG. 3 embodiment differs from the FIG. 1 embodiment in the manner of deriving the waveform C and in the manner of positioning the waveforms B and C to obtain the substantially square waveform D.

In particular, the waveform C is derived from the waveform B by means of a circuit branch which includes a differentiating circuit 15, a flip-flop 16 and an isolating device 17 connected in the named order between the anode of storage diode DS2 and the input 5 of the summing circuit 6. The differentiating circuit 15, which may be any suitable differentiator such as a series resistance and shunt inductance, responds to the fast or steep trailing edge transitions of the waveform B to provide successive positive and negative triggering pulses to the input of the flip-flop 16. The flip-flop 16 responds to successive trigger pulses to switch between its stable states to provide at its output a periodic waveform as illustrated by waveform C in FIG. 4. The flip-flop 16, for example, may be any suitable flip-flop such as a pair of cross-coupled transistor inverters in which the successive positive and negative trigger pulses are applied to the base electrode of one of the inverting transistors and the output of which is taken from the collector electrode of the same transistor. As can be seen from the waveform C in FIG. 4, the transitions between the two amplitude levels may be slow or inclined relative to the fast or steep transitions of the waveform B, for example, the transitions of the waveform C may have a duration on the order of several nanoseconds as compared to a fraction of a nanosecond for the trailing edge transitions of the waveform B. Thus, the frequency spectrum of the waveform C in FIG. 4 is poor in harmonic content relative to the harmonic content of the waveform B. The output of flip-flop 16 is applied by way of an isolation element 17 to the summing circuit 6.

Unlike the embodiment of FIG. 1, the waveform B is not directly added to the waveform C. Instead the waveform B is applied by way of a delay circuit 13 and an isolating device 14 to the summing circuit input 4. The delay circuit 13, which may be any suitable delay line, delays the waveform B to provide a waveform B′ illustrated in FIG. 4 by the dashed waveform superimposed on the same time base as the waveform B. The amount of delay is such that the positive and negative going trailing edge transitions of the waveform B′ overlap the time intervals defined by the slower positive and negative going transitions, respectively, of the waveform C. For example, the trailing edge of the waveform B pulse which occurs at time $t_1'$ is delayed to the time $t_1''$ which occurs during the negative going transition of the waveform C. The isolation devices 14 and 17 are provided to isolate on the one hand the storage diode arrangement 3 from the waveform C and on the other hand the flip-flop 16 from the delayed waveform B′. These isolation devices may be any suitable isolating device such as a high pass filter for the device 14 and a low pass filter for the device 17.

The summing circuit 6 sums the waveforms B′ and C to provide at its output the waveform D having fast or steep transitions and fairly constant amplitude levels. As can be seen in FIG. 4, the amplitude levels of the waveform D are not truly constant but contain amplitude blips 21. As in FIG. 1, the shaping network 8 functions to clip amplitude levels of the waveform D to provide an output voltage waveform E which is substantially square in shape. As in FIG. 1, the shaping network 8 may also include DC level shifting means. Moreover, it should be noted that the shaping network 8 is not needed in some applications wherein the amplitude blips 21 of the waveform D are of little or no consequence to the load impedance 10. In such cases, the waveform D can be directly applied to the load impedance 10.

An attractive feature of the FIG. 3 embodiment is that the source frequency can be changed without corresponding component adjustments. Thus, the FIG. 3 embodiment is well suited for use where the source frequency is variable. On the other hand, the simplicity of the FIG. 1 embodiment is also attractive such that the use of either the FIG. 1 or FIG. 3 embodiment is a matter of choice for each application.

Thus, there has been described a signal generator capable of generating waveforms having substantially square shapes at relatively high repetition rates. Moreover, the amplitude levels of the generated waveforms are limited only by the characteristics of the charge storage diodes. Further it should be apparent to those skilled in the art that the storage diodes DS1 and DS2 could be polarized in the opposite directions so long as the polarity of the bias source 12 is reversed.

What is claimed is:

1. In combination:

a source providing an alternating signal of frequency *f* having half periods of the same duration and shape and having relatively slow rise and fall times;

means for deriving from said alternating signal a bipolar pulse train of frequency *f* having also half periods of the same duration and shape and each pulse of which has one relatively steep edge;

means coupled to said source and to said last-named means for producing a relatively delayed alternating signal of frequency *f* having half periods of the same duration and shape and each region of maximum slope of which coincides in time with a steep edge of a pulse of said pulse train; and means for summing said bipolar wave train and said relatively delayed alternating signal to provide a sum signal of the same frequency as, but with substantially faster rise and fall times than, said alternating signal.

2. The invention according to claim 1 wherein said means for producing said relatively delayed alternating signal includes a delay means for delaying the first-mentioned alternating signal.

3. The combination claimed in claim 1, wherein said first-named means comprises a pair of back-to-back connected charge storage diodes.

4. The combination set forth in claim 1, further including wave shaping means for translating said sum signal to a square wave.

5. The combination set forth in claim 1, wherein said means for producing a relatively delayed signal comprises means including a flip-flop responsive to said pulses for producing a substantially square wave which is delayed relative to said alternating signal provided by said source.

6. The combination comprising:

a first channel comprising two charge storage diodes connected in series, each such diode having a cathode electrode and an anode electrode, and said diodes being connected like-electrode-to-like-electrode;

means for applying an alternating signal of fundamental frequency *f* and period T to said first channel, said signal having two peaks, one relatively positive and the other relatively negative, and having positive-going edges extending between the relatively negative and relatively positive peaks and negative-going edges extending between the relatively positive and relatively negative peaks, whereby said first channel produces bipolar pulses of fundamental frequency *f* and higher order harmonics such that one edge of each pulse is relatively steep;

a second channel comprising delay means for delaying said alternating signal an amount to cause its positive-going and negative-going edges to be concurrent with the positive-going and negative-going edges, respectively, of the signal from said first channel;

means for summing the signals from said first and second channels to obtain a third signal having relatively steep edges and having a fundamental frequency *f* and period T; and means for shaping said third signal.

7. In combination:

means providing a sine wave;

means for deriving from said sine wave a bipolar pulse train each pulse of which has a relatively steep lagging edge coinciding in time with a point of minimum slope of said sine wave, alternate ones of said pulses having steep positive-going lagging edges and the remaining pulses having steep negative-going lagging edges;

means for delaying said sine wave an amount such that the positive-going edges of said delayed sine wave are concurrent with the relatively steep positive-going lagging edges of alternate ones of said bipolar pulses and the negative-going edges of said delayed sine wave are concurrent with the negative-going lagging edges of the remaining bipolar pulses; and means for summing said delayed sine wave and said bipolar pulse train to provide a wave having substantially steeper leading and lagging edges than said sine wave.

8. In combination:

a source providing a sine wave;

means for deriving from said sine wave a bipolar pulse train of the same frequency as the sine wave having half periods of the same duration and shape and each pulse of which has one relatively steep edge;

means for differentiating said bipolar pulse train;

means responsive to said differentiated pulse train for producing a substantially square wave which is delayed in time relative to said sine wave;

means for delaying said bipolar pulse train an interval such that its steep edges coincide in time with the leading and lagging edges, respectively, of said substantially square wave; and means for summing said bipolar pulse train and said substantially square wave.

9. The combination set forth in claim 8, further including a high pass filter through which the delay bipolar pulse train passes and a low pass filter through which the substantially square wave passes.

References Cited

UNITED STATES PATENTS

| | | | |
|---|---|---|---|
| 3,200,267 | 8/1965 | Cubert | 307—319 |
| 3,205,375 | 9/1965 | Berry et al. | 307—261 |
| 3,217,260 | 11/1965 | Wu | 328—61 |
| 3,238,382 | 3/1966 | Ott | 307—261 |

JOHN S. HEYMAN, Primary Examiner

STANLEY D. MILLER, Assistant Examiner

U.S. Cl. X.R.

307—268, 319; 328—28, 61